United States Patent
Wang et al.

(10) Patent No.: US 10,579,042 B2
(45) Date of Patent: Mar. 3, 2020

(54) DEFECT RATE ANALYTICS TO REDUCE DEFECTIVENESS IN MANUFACTURING

(71) Applicant: Hitachi, Ltd., Chiyoda-ku, Tokyo (JP)

(72) Inventors: Qiyao Wang, Sunnyvale, CA (US); Susumu Serita, San Jose, CA (US); Chetan Gupta, San Mateo, CA (US)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 16/025,865

(22) Filed: Jul. 2, 2018

(65) Prior Publication Data

US 2020/0004219 A1  Jan. 2, 2020

(51) Int. Cl.
G05B 19/406 (2006.01)

(52) U.S. Cl.
CPC .. *G05B 19/406* (2013.01); *G05B 2219/32222* (2013.01)

(58) Field of Classification Search
None
See application file for complete search history.

(56) References Cited

U.S. PATENT DOCUMENTS

| | | | |
|---|---|---|---|
| 2012/0226476 A1* | 9/2012 | Shingaki | G05B 23/0245 702/181 |
| 2013/0041709 A1* | 2/2013 | Civil | G06Q 10/0639 705/7.27 |
| 2014/0067302 A1* | 3/2014 | Bickford | H01L 22/20 702/81 |
| 2016/0189055 A1 | 6/2016 | Zvitia | |
| 2017/0083830 A1 | 3/2017 | Bates et al. | |
| 2018/0060702 A1 | 3/2018 | Ma et al. | |

OTHER PUBLICATIONS

Extended European Search Report for related European Patent Application No. 19156586.0, dated Jun. 12, 2019; 7 pages.
Casella, G., & Berger, R. L. (2002). Statistical Inference (vol. 2). Pacific Grove, CA: Duxbury.
Mitchell, T. M. (1997). Machine Learning. 1997. Burr Ridge, IL: McGraw Hill, 45(37), 870-877.

* cited by examiner

Primary Examiner — Ryan A Jarrett
(74) Attorney, Agent, or Firm — Procopio, Cory, Hargreaves & Savitch LLP

(57) ABSTRACT

Example implementations described herein are directed to systems and methods for defect rate analytics to reduce defectiveness in manufacturing. In an example implementation, a method include determining, from data associated with each feature for a manufacturing process, the data feature indicative of process defects detected based on the feature, an estimated condition for the feature that reduces a defect rate of the process defects, the estimated condition indicating the data into a first group and second group; calculating the rate reduction of the defect rate based on a difference in defects between the first group and the second group; for the rate reduction meeting a target confidence level for a target defect rate, applying the estimated condition to the manufacturing process associated with each of the features. In example implementations, the defect rate analytics reduce defectiveness in manufacturing with independent processes and/or dependent processes.

18 Claims, 9 Drawing Sheets

_400_

| Product ID | Process 1 | ... | Process N | Defect label |
|---|---|---|---|---|
| 60001 | 12.5 | ... | 100 | Pass |
| 60002 | 11.1 | ... | 110 | Pass |
| 60003 | 19.3 | ... | 109 | Fail |
| 60004 | 9.9 | ... | 114 | Pass |
| ... | ... | ... | ... | ... |

| Product ID | Process 1 | Modified Process 2 | ... | Modified Process N | Defect label |
|---|---|---|---|---|---|
| 60001 | 12.5 | 2.1 | ... | 47 | Pass |
| 60002 | 11.1 | 2.7 | ... | 45 | Pass |
| 60003 | 19.3 | -1.1 | ... | 32 | Fail |
| 60004 | 9.9 | 3.6 | ... | 66 | Pass |
| ... | ... | ... | ... | ... | ... |

FIG. 8

DEFECT RATE ANALYTICS TO REDUCE DEFECTIVENESS IN MANUFACTURING

BACKGROUND

Field

The present disclosure relates generally to defect rate analytics, and more specifically, to defect rate analytics to reduce defectiveness in manufacturing.

Related Art

In the field of manufacturing, a failure rate indicates that a manufacturing line has suboptimal performance. Defective units can refer to units that do not meet a quality standard, take a longer time to complete a task, are not available due to a breakdown or a machine changeover, etc. To quantify the health of manufacturing lines, metrics are typically used that include defect rates, overall equipment effectiveness, task time, downtime, and profits.

Manufacturers monitor metrics to meet business objectives. If any metrics of interest have anomalies, manufacturers traditionally respond by relying on experts with domain knowledge to investigate by researching and/or testing to figure out contributing factors and potential root causes. However, the process of experts investigating failure rates for manufacturing lines based on domain knowledge generally involves considerable expertise, labor, and time. Further, the more complicated manufacturing processes, the more expensive applying domain knowledge to potentially reduce failure rates becomes. For example, domain knowledge cannot effectively figure out reasons for the high defect rates, as the root cause may be a combination of multiple factors.

SUMMARY

An example implementation includes a method for defect rate analytics to reduce defectiveness in manufacturing. In an example implementation, the method includes determining, from data associated with each feature for a manufacturing process, the data feature indicative of process defects detected based on the feature, an estimated condition for the feature that reduces a defect rate of the process defects, the estimated condition indicating the data into a first group and second group; calculating the rate reduction of the defect rate based on a difference in defects between the first group and the second group; for the rate reduction meeting a target confidence level for a target defect rate, applying the estimated condition to the manufacturing process associated with each of the features. In example implementations, the defect rate analytics reduce defectiveness in manufacturing with independent processes and/or dependent processes.

Aspects of the present disclosure can include a system with a memory and processing device configured for defect rate analytics to reduce defectiveness in manufacturing. In an example implementation, the system includes determining, from data associated with each feature for a manufacturing process, the data feature indicative of process defects detected based on the feature, an estimated condition for the feature that reduces a defect rate of the process defects, the estimated condition indicating the data into a first group and second group; calculating the rate reduction of the defect rate based on a difference in defects between the first group and the second group; for the rate reduction meeting a target confidence level for a target defect rate, applying the estimated condition to the manufacturing process associated with each of the features. In example implementations, the defect rate analytics reduce defectiveness in manufacturing with independent processes and/or dependent processes.

Aspects of the present disclosure can include a non-transitory computer readable medium storing instructions for defect rate analytics to reduce defectiveness in manufacturing. In an example implementation, the instructions include determining, from data associated with each feature for a manufacturing process, the data feature indicative of process defects detected based on the feature, an estimated condition for the feature that reduces a defect rate of the process defects, the estimated condition indicating the data into a first group and second group; calculating the rate reduction of the defect rate based on a difference in defects between the first group and the second group; for the rate reduction meeting a target confidence level for a target defect rate, applying the estimated condition to the manufacturing process associated with each of the features. In example implementations, the defect rate analytics reduce defectiveness in manufacturing with independent processes and/or dependent processes.

Aspects of the present disclosure can include a means for defect rate analytics to reduce defectiveness in manufacturing with means for determining, from data associated with each feature for a manufacturing process, the data feature indicative of process defects detected based on the feature, an estimated condition for the feature that reduces a defect rate of the process defects, the estimated condition indicating the data into a first group and second group; means for calculating the rate reduction of the defect rate based on a difference in defects between the first group and the second group; for the rate reduction meeting a target confidence level for a target defect rate, means for applying the estimated condition to the manufacturing process associated with each of the features. In example implementations, the defect rate analytics includes means for reducing defectiveness in manufacturing with independent processes and/or dependent processes.

BRIEF DESCRIPTION OF DRAWINGS

FIG. 4 illustrate a table of example prepared data in accordance with an example implementation.

FIG. 8 illustrates a table of example output data for dependent processes in accordance with an example implementation.

DETAILED DESCRIPTION

Figure 1:
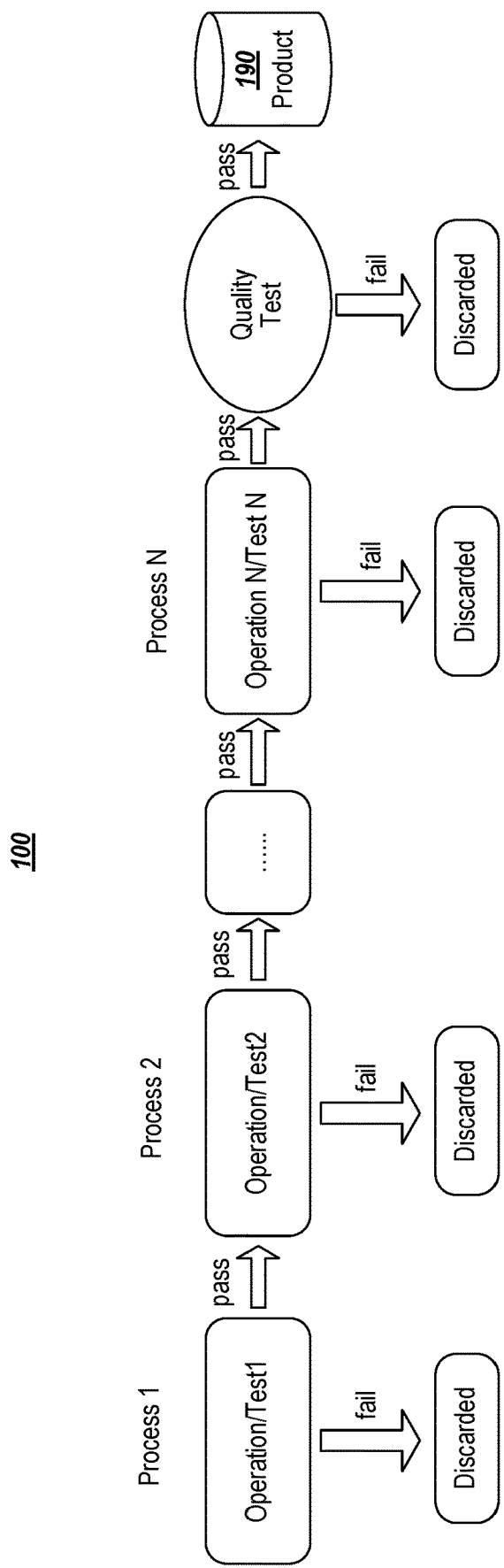
FIG. 1 illustrates an example manufacturing line sequence in accordance with example implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Industrial manufacturing is the making of merchandises using labor and/or machines on a large scale. Usually by taking a sequence of designed manufacturing steps (e.g., assembling, chemical and biological processing, formulation, etc.), raw materials are transformed into finished goods, which are sold either to other manufacturers to produce more complex products or to retailers for direct selling.

Defect rate is calculated by the number of defective units over the total number of production within a certain time frame. High defect rates directly result in financial losses, as the materials, the labor, the time consumed by the defective units cannot contribute to the total profits. Minimizing defect rates helps manufacturers to achieve their profitability goals.

Overall equipment effectiveness (OEE) can be calculated based a formula (Availability)*(Performance)*(Quality). However, the justification of availability, performance and quality is not always an easy task. Alternatively, OEE can be calculated by dividing a minimum time needed to produce one unit by an actual time used to produce one. OEE evaluates how effectively a manufacturing line is operated.

Takt time is the amount of time for the completion of a product or a task. Understanding takt time metrics enables manufacturers to plan their production accordingly to meet the customer needs. For example, real-time takt time monitoring helps to track the real-time health of production lines. Reducing the downtime caused by a breakdown or a machine changeover helps to meet the financial goals. Profit is another important indicator for manufacturers.

Manufacturers monitor metrics to meet business objectives. However the process of experts investigating failure rates for manufacturing lines based on domain knowledge generally involves considerable expertise, labor, and time. Further, the more complicated the manufacturing processes are, the more expensive it becomes to apply domain knowledge to potentially reduce failure rates. With the emergence of big data analysis techniques, people in the industrial manufacturing field start to seek data-driven strategies to improve processes, drive productivity, increase equipment availability and maintain a competitive edge in the global economy.

An example aspect of the present disclosure is directed to analyzing defect rates. In an example implementation, innovative systems are presented to systematically identify candidate factors which may be highly correlated with high defect rates, as well as create an interpretable metric to quantify the effectiveness of each factor.

An example aspect of the present disclosure simplifies failure rate handling processes. In an example, domain experts can confidently constrain their attention to a few factors and save a considerable amount of time and effort.

An example aspect of the present disclosure provides straightforward recommendations about how each factor affects failure metrics (e.g., the defect rate, and metric to directly quantify a minimum amount of reduction in overall failure rate).

FIG. 1 illustrates an example manufacturing line sequence in accordance with example implementations. FIG. 1 illustrates an example of a common type of manufacturing line 100 that is structured to include production lines made up of a definite number of sequential processes (e.g., Process 1, Process 2, . . . Process N). Input to the manufacturing line can include, for example, raw materials that are moved through a sequence of processes Process 1, Process 2, . . . Process N to produce and/or output a manufactured unit. Within each process, human operators and/or automotive machines perform some operations (e.g., shape a wire, attach wires to a main body, rotate a wheel, etc.) and/or perform some tests (e.g., measure the temperature, measure the length of the body, etc.). For example, Process 1 takes the raw material input to perform Operation/Test1 that outputs a unit to Process 2 to perform Operation/Test2 and outputs the unit along sequence of process to Process N to perform Operation/TestN. Data about the operations or tests are usually recorded by a manufacturing or quality control system (not shown). As the manufactured units progress through the manufacturing line 100, each process can include a process level defect tests to discard partially manufactured products that fail a test or quality review. That is, each process can include a process level operation and/or test to determine if the unit passes or fails the process before moving to the next process in the sequence.

Units passed along the processes typically undergo thorough quality examination by human visual inspection or machine tests. For example, a defective unit can be discarded when an aspect of the unit fails a test or some severe or noticeable defects are discovered by operators or machines. In the example, Operation/Test1 can pass a unit to Operation/Test2 when no defect is detected during Process 1, and then Process 2 may discard the unit in response to detecting a defect. Accordingly, a partially manufactured unit that fails a process is not passed to the next process in the manufacturing line 100 to improve detection of defects and avoid wasting resources. Further, the manufacturing line 100 can include a final Quality Test to discard units that fail inspection. Thus, units that fail any of the quality examinations are discarded and units that pass all the quality examinations can be output as products 190.

An example aspect of the present disclosure includes quantifying relationships between data from Process 1 to Process N and the quality test results. A multi-phase example implementation includes: (i) identifying which processes contribute to relatively more defective units than other processes in the manufacturing line (e.g., failure during a quality test); (ii) determining a recommendation for how a manufacturer can control processes and/or conditions to reduce failure rate in the quality test (e.g., recommend to modify a rotation angel based on a threshold); and (iii) based on the recommendation, predicting how a failure rate of the quality test will change (e.g., decreases by a certain amount, percentage, etc.).

Each phase of the multi-phase implementation work together to provide directions (which processes) to examine for a root cause analysis and also provide guidelines about suspicious values as part of a recommended processes that outputs possible improvement in the quality test. Example implementations can be efficiently generalized to analyze a pass/fail result in any process. For example, a target rate can be replaced with a binary result (e.g., pass/fail result) for each process of interest, and candidate processes can be combined based on preceding processes in the manufacturing line.

The first phase (i.e., identifying processes which are highly related with the result in a quality test) can involve statistical or classification model approaches. For example, statistical approaches for identifying processes related to a quality test result includes traditional mean/quantile statistical tests wherein the larger the differences are in terms of statistical properties (e.g., mean, median, or 75th percentile) between a fail group and a pass group, the higher the process is related to the test result. The statistical approaches are generally easy to implement since statistical tests are typically included in computing software. However, the results from statistical approaches may depend on the choice of both appropriate statistical properties to compare and reasonable test procedures. Making sensible judgements in statistical approaches requires a deep understanding of the data itself as well as actual knowledge of the requirements for each specific statistical test procedure. Further, the dependency of statistical approaches on subjective judgements may make it difficult to embed in a reusable algorithm system.

In the classification model approach, classification models in machine learning are used to address the problem in a different perspective from the statistical approaches. The classification model approach involves trying to build a mapping function between a pass/fail label in the quality test and the processes. Highly related processes generally refer to processes that play important roles in the mapping function. The classification model approach typically employs classification algorithms that take interaction effects among the processes into account. However, some classification models have difficulty quantifying the importance of each process in the built mapping function (e.g., Naïve Bayes Classifier, K-Nearest Neighbor, Support Vector Machines).

It is further noted that comparing statistical properties and decision tree searching related art approaches for the second phase (i.e., (ii) providing recommendations about how to control highly-related processes) can produce inaccurate results. For example, comparing related art statistical properties approaches can only provide partial information.

In an example, suppose for a manufacturing process, the fail group has statistically significant larger rotation angles than a pass group at process 10. Based on this information, over-rotating in process 10 is harmful, however, it is not clear how to make the recommendations to the manufacturer (i.e., smaller than 90 degrees, or 60 degrees, or 40 degrees). A decision tree can search for regions having a high defect rate, whereupon a recommendation can then be generated to indicate to the manufacturer configurations to avoid falling into these high defect rate regions. However, as a classification model, the decision tree cannot take sampling errors into account. The current product units used to build a model may not be an accurate representation for the entire product 190 units that are produced in the past or those that will be produced in the future. Consequently, the regions may not be accurate. For example, based on the decision tree model built by the current data, the rotation degree should be less than 35 degrees, however, the true boundary may not exactly 35 degrees. Suppose the true boundary is 40 degrees or 30 degrees in reality. Such an overestimated or underestimated threshold may cause financial losses to the manufacturer.

Figure 2:
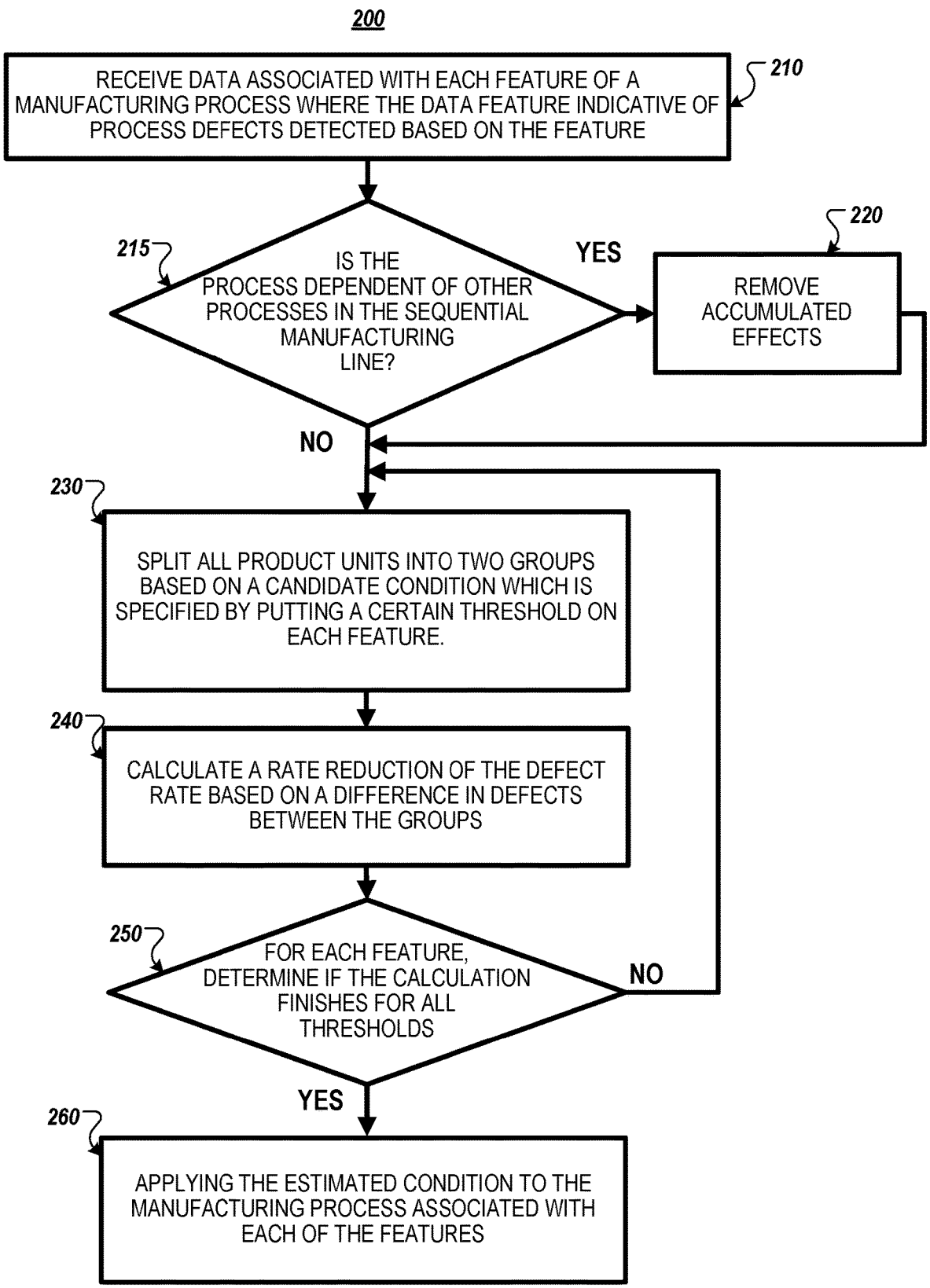
FIG. 2 illustrates a flow diagram to reduce defectiveness in accordance with an example manufacturing implementation.

FIG. 2 illustrates a flow diagram to reduce defectiveness in accordance with an example manufacturing implementation. In a first example implementation, different processes in the manufacturing line are independent from each other. That is, in a sequential manufacturing line operations/tests of a latter or downline process (e.g., Process 2) do not directly depend on the operations/tests in earlier stages (e.g., of Process 1). For example, if each of the operations or tests are done on different and unrelated parts of the products, then the processes associated with each operation or test are considered to be independent.

In a second example implementation, one or more processes in a sequential manufacturing line may be related to or dependent on another process. That is, operations/tests of a latter or downline process (e.g., Process 2) that are partially resulted by the operations/tests of earlier stages (e.g., of Process 1) performed prior in the manufacturing sequence have an accumulated effect. For example, a manufacturing line that shapes wires into a specific shape can include Process 1 with operations to heat the wires, Process 2 with operations to shape the wires in a first direction, Process 3 with operations to shape the wires in another direction, Process 4 with operations to cool the wires down, etc. Thus, Process 2 and Process 3 depend on sufficient heating temperature in Process 1, Process 3 shaping for the another direction may require proper shaping in Process 2, and Process 4 finalizes the shape if the wire unit passed Process 3 and/or all the prior processes in the sequence. To detect highly-related processes for the quality test examine each process independently. In the second example implementation with related processes, the accumulated effects are removed and then method examines the resulted process data independently.

Example aspects of the present disclosure include providing systems and methods to identify processes of manufacturing lines which can significantly affect the result in the quality test; generate specific recommendations regarding how the manufacturer can control operations/tests in highly-related processes; and creates a robust estimate for the improvement in defect rates. The robust estimate is used to ensure that a realized improvement after implementing the recommendation will be as least as large as a predicted value.

In an example process 200, at 210 a defect rate analytics system receives data associated with each feature of a manufacturing process where the data feature indicative of process defects detected based on the feature. At 215, the defect rate analytics system determines whether the process is dependent on other processes in the sequential manufacturing line.

Figure 5:
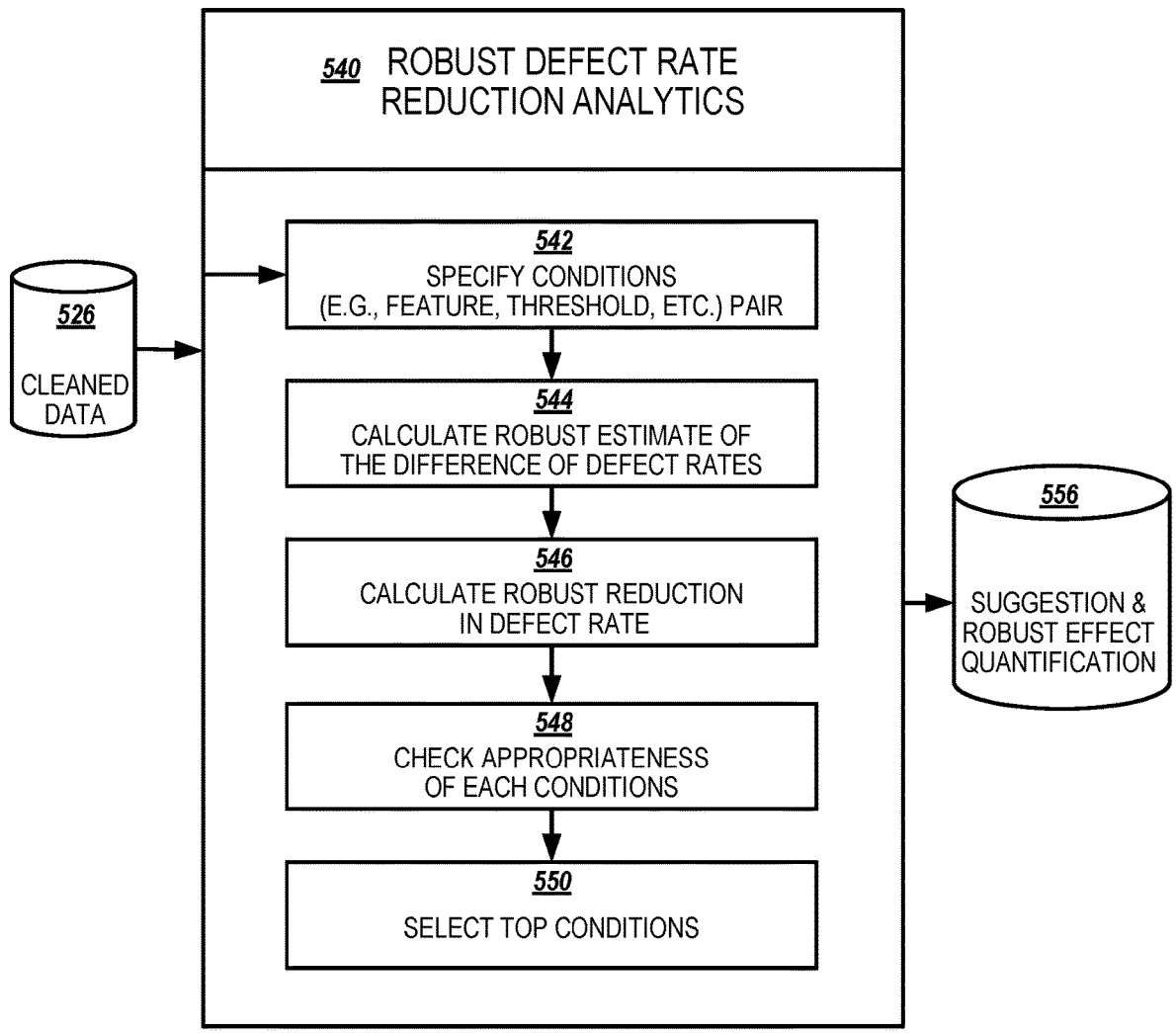
FIG. 5 illustrates an example robust defect rate reduction analytics module in accordance with an example implementation.
Figure 6:
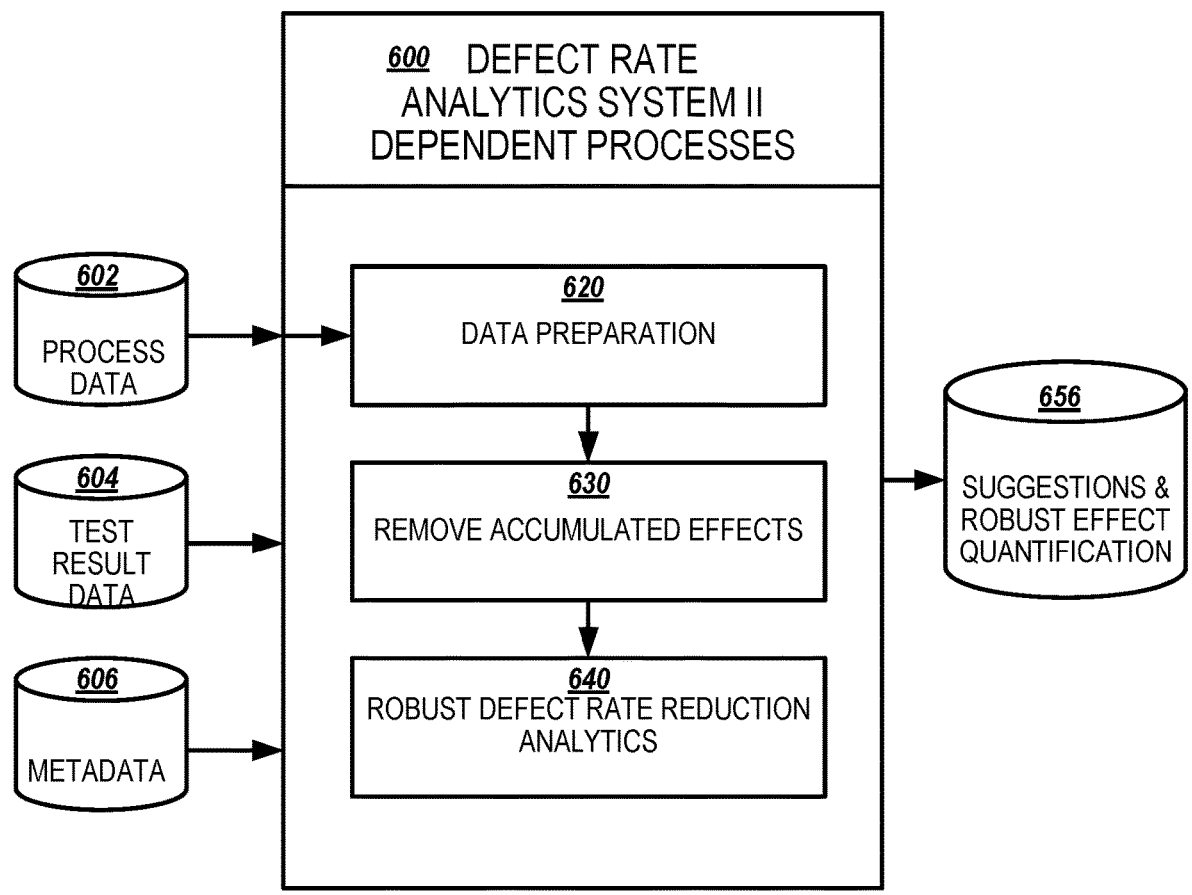
FIG. 6 illustrates an example defect rate analytics system with dependent processes in accordance with an example implementation.
Figure 7:
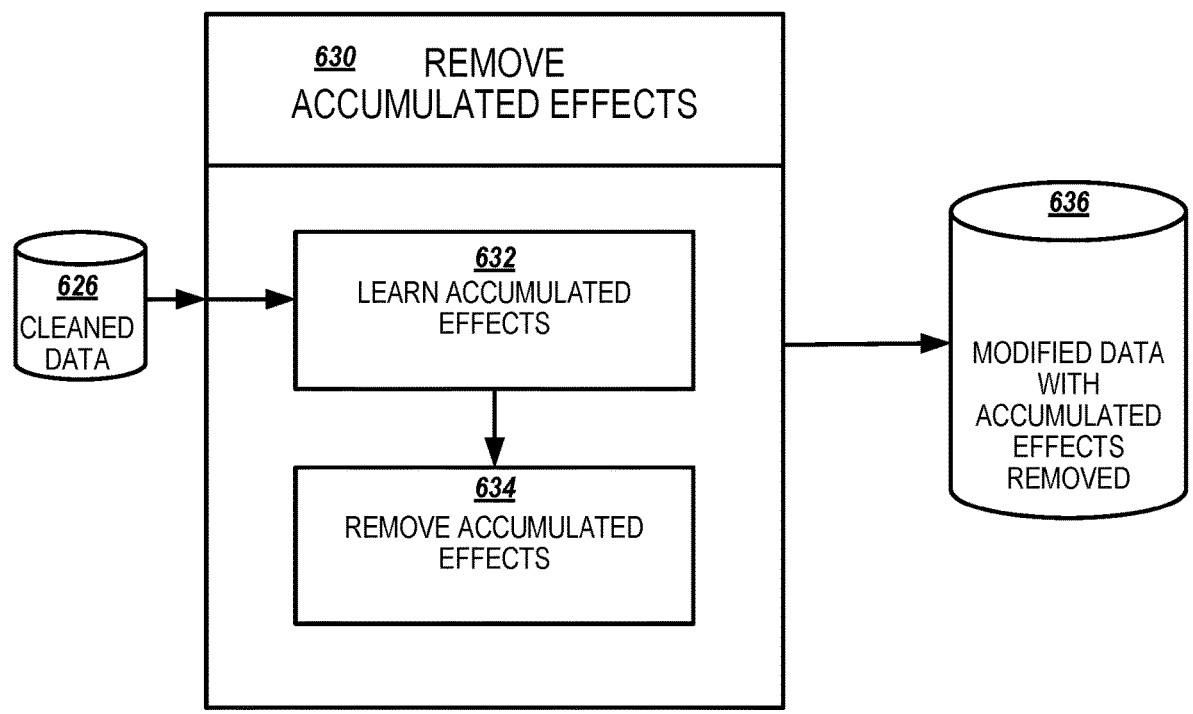
FIG. 7 illustrates an example remove accumulated effects module in accordance with an example implementation.

At 220, if so (Yes), the defect rate analytics system removes accumulated effects as described in reference to FIGS. 5-7. After the accumulated effects are removed, the process 200 proceeds to 230. At 220, if processes are independent of other process (No), the process 200 proceeds to 230.

At 230, the process splits all product units into two groups based on a candidate condition which is specified by putting a certain threshold on each feature. For example, the product units are split into two groups based on an candidate condition (e.g., units with feature 1<=threshold {1,1}, and units with feature 1>threshold {1,1}).

At 240, the defect rate analytics system calculates a rate reduction of the defect rate that meets a target confidence level based on a difference in defects between the two groups.

At 250, for each feature, the defect rate analytics system determines if the calculation finishes for all thresholds. For each feature, there are multiple conditions (i.e., multiple thresholds). For a given condition, the calculation produces a robust defect rate reduction which is to meet the target confidence level. Based on the condition that yields the largest robust defect rate reduction, the defect rate analytics system determines a final estimated condition, and then applies the determined condition to the manufacturing process.

If so at 250 (Yes), the process 200 proceeds to 260 to apply the estimated condition to the manufacturing process associated with each of the features. Otherwise at 250 (No), the process 200 returns to 230 to repeat splitting all product units into two groups based on an updated candidate condition which is specified by putting an updated threshold on each feature.

Independent Processes Implementation

Figure 3:
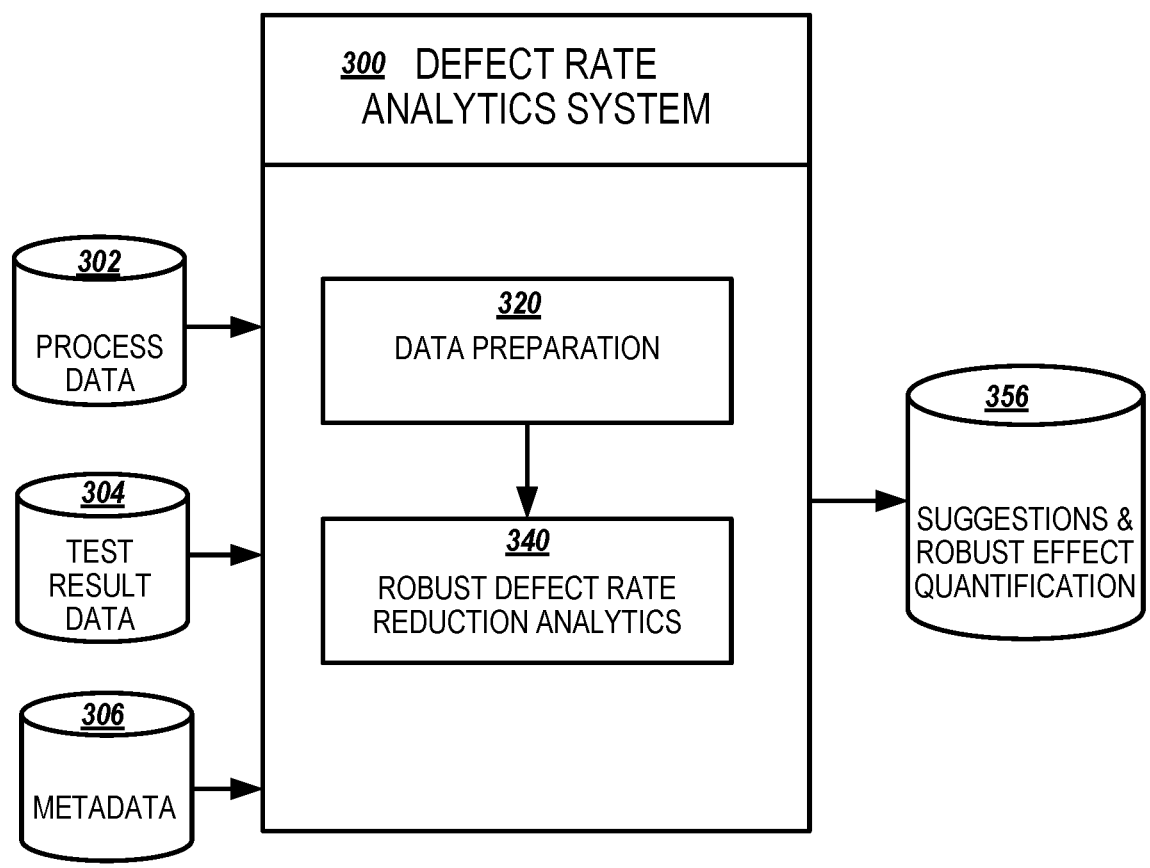
FIG. 3 illustrates an example defect rate analytics system in accordance with an example implementation.

FIG. 3 illustrates an example defect rate analytics system 300 in accordance with an example implementation. Example implementations are directed to processes along a sequential manufacturing line where the process are independent. Example implementations receives input data from different sources, including process data 302, test result data 304, and metadata 306.

Process data 302 can include historical discrete operating or test data recorded by the system at each producing process along the manufacturing line. For example, at process 1, the height of the body part is recorded; at process 2, the time of warming the material is measured; at process 3, the minimum rotating angle and maximum rotating angle are included in the process data set, and so forth. Process data usually include a group of product units, both defective units and qualified units.

Test result data 304 in quality examination can include labels indicating which units failed the quality test and which units passed the quality test. Sometimes, for the defective units, test result data also specify which part is defective (e.g., main body, top, bottom, inside, etc.) or what kind of defects (e.g., wire peel, wrong shape, etc.) has occurred. When additional information about the defects is included, each part or type of defects can be analyzed separately. As it is highly possible that different kinds of defects relate to different sets of processes, considering them separately allow for discovering more accurate information. As used herein, defect rate and defective units are used interchangeably to refer to general defectiveness and/or certain specific defectiveness, depending on the real situation and use cases.

Metadata 306 refers to data that describes extra information about the characteristic of the processes. For example, invalid data of a system is excluded from the data analysis (e.g., 0 or 1 are meaningless data in process 10).

An example implementation of the independent processes implementation includes a data preparation 320 module and robust defect rate reduction analytics 340 module outputs suggestions (e.g., recommendations) and robust effect quantifications 356. Data preparation 320 prepares raw process data by transforming it into a convenient format, handling missing values and outliers, removing invalid data, etc., as described in reference to FIG. 4. Robust defect rate reduction analytics 340 can include searches for processes which are highly related to the high defect rate in the quality test and detection of high risk regions in those processes to calculate a robust metric that quantifies the reduction in defect rate when a manufacturer can avoid those high-risk regions as described in reference to FIG. 5. The robust defect rate reduction analytics 340 can output highly correlated processes, how to control the relevant processes (e.g., process 1 <40, process 2>100, etc.), and the corresponding robust estimates of defect rate reductions.

FIG. 4 illustrates a table 400 of example prepared data in accordance with an example implementation. To conduct data preparation 320, process data is recorded by a central system and sorted by the time received. The row index includes time stamps and/or product identifiers. Data preparation 320 consolidates raw data from different sources and obtains data in a tabular format. For example, data preparation 320 can output columns representing processes and each row representing the process data of a product unit. The data can include missing values, outliers, and invalid data in the process data. The second data preparation handles these issues.

The table 400 includes sample output of data preparation 320 for products with product IDs 60001, 60002, 60003, 60004, etc. For example, the product with product ID 60001 have value 12.5 for Process 1, . . . , value 100 for Process N, and a defect label of Pass. The product with product ID 60002 have value 11.1 for Process 1, . . . , value 110 for Process N, and a defect label of Pass. The product with product ID 60003 have value 19.3 for Process 1, . . . , value 109 for Process, and a defect label of Fail. The product with product ID 60004 have value 9.9 for Process 1, . . . , value 114 for Process, and a defect label of Pass.

The data preparation 320 module can use the product ID as the key variable. For each product ID, search along the rows to find the corresponding data in process 1 to process N in the raw process data set, then sort the data by the process name and store in a row. For each product ID, data preparation 320 module searches test data set to locate defect labels associated with the product ID and attach or assign the product ID next to the last process data. For each column, (i.e., each process data) the data preparation 320 module:

a. Based on information in the metadata set, count the number of meaningless data, denoted as $n_{meaningless}$;

b. Based on the outlier detection rule in statistics, using valid data only to count the number of outliers, denoted as $n_{outlier}$;

c. If the summation of $n_{meaningless}$ and $n_{outlier}$ is larger than a pre-specified threshold (e.g., 40% of the total number of units), then delete this column from the analysis. For example, there may not be a significant enough valuable data contained in this column.

For each row (i.e., product unit), data preparation 320 module checks whether there exist valid data (e.g., not meaningless data and not outliers) for all remaining columns and deletes the rows with at least one invalid data.

FIG. 5 illustrates an example robust defect rate reduction analytics module 540 in accordance with an example implementation. Robust defect rate reduction analytics module 540 provides a systematical approach to search for high risk regions in the process data space using cleaned data 526 from the data preparation (e.g., data preparation 320 of FIG. 3) to select top conditions for determining suggestions and robust effect quantifications 556. The robust defect rate reduction analytics module 540 provides a robust and interpretable metric to directly quantify the reduction in defect rate supposing the manufacturer can avoid those high-risk regions.

In an example implementation, the robust defect rate reduction analytics module 540 at 542, specify conditions: for a given feature $x_i$, i=1, . . . , N, specify k equally-spaced threshold values within its range. The threshold values are denoted as $\theta_{i,j}$=1, . . . , k. Define a feature-threshold pair ($x_i$, $\theta_{i,j}$) as a condition. Based on a given condition, divide all the product units into two groups. For example, $G_{i,j,1}=\{\text{units satisfying } x_i \leq \theta_{i,j}\}$ $G_{i,j,2}=\{\text{units satisfying } x_i \geq \theta_{i,j}\}$ At 544, the robust defect rate reduction analytics module 540 calculates robust estimate of the defect rate difference: let $p_{i,j,i}$ is the true unknown defect rate in $G_{i,j,1}$, similarly, $p_{i,j,2}$ is the true unknown defect rate in $G_{i,j,2}$. If $p_{i,j,1}$ and $p_{i,j,2}$ are different by a large amount (e.g., over a predetermined threshold), it indicates that a larger reduction in the overall defect rate can be achieved when the high-risk group has a defect rate as low as the other group. So $p_{i,j,1} - p_{i,j,2}$ is a metric of interest. Based on knowledge in statistics, the module 540 estimates the unknown values based on a current sample. For example, the point estimates of $p_{i,j,1}$ and $p_{i,j,2}$ are $$\hat{p}_{i,j,1} = \frac{\text{\# of defective units in } G_{i,j,1}}{\text{total \# of units in } G_{i,j,1}}$$

$$\hat{p}_{i,j,2} = \frac{\text{\# of defective units in } G_{i,j,2}}{\text{total \# of units in } G_{i,j,2}}$$

The point estimate of $p_{i,j,1} - p_{i,j,2}$ is then $\hat{p}_{i,j,1} - \hat{p}_{i,j,2}$. This estimate will converge closer to its true value if the sample size (i.e. how many units in the current sample) goes to infinity. However, in some examples, the current sample size may be in the scale of thousands or even less. To ensure the robustness of the estimate, a confidence interval technique in statistics is employed. Instead of indicating that $p_{i,j,1} - p_{i,j,2}$ equals to $\hat{p}_{i,j,1} - \hat{p}_{i,j,2}$, the confidence interval indicates that the unknown $p_{i,j,1} - p_{i,j,2}$ with $(1-2\alpha)\%$ confidence being between a lower band value and an upper band value, which are $$\delta_{i,j,lower} = (\hat{p}_{i,j,1} - \hat{p}_{i,j,2}) - z(1-\alpha)\sqrt{\frac{\hat{p}_{i,j,1}(1-\hat{p}_{i,j,1})}{n_{i,j,1}} + \frac{\hat{p}_{i,j,2}(1-\hat{p}_{i,j,2})}{n_{i,j,2}}}$$

$$\delta_{i,j,upper} = (\hat{p}_{i,j,1} - \hat{p}_{i,j,2}) + z(1-\alpha)\sqrt{\frac{\hat{p}_{i,j,1}(1-\hat{p}_{i,j,1})}{n_{i,j,1}} + \frac{\hat{p}_{i,j,2}(1-\hat{p}_{i,j,2})}{n_{i,j,2}}}$$

where $n_{i,j,1}$ is the total number of units in $G_{i,j,1}$ and $n_{i,j,2}$ is the total number of units in $G_{i,j,2}$. $z(1-\alpha)$ is the upper $\alpha$ quantile of $N(0,1)$, i.e, it satisfies $P(N(0,1) > z(1-\alpha)) = \alpha$. In an example implementation, $\tilde{\delta}_{i,j}$ is used as a robust estimate of $p_{i,j,1} - p_{i,j,2}$, where $$\tilde{\delta}_{i,j} = \begin{cases} \delta_{i,j,lower}, & \text{if } \hat{p}_{i,j,1} > \hat{p}_{i,j,2} \\ -\delta_{i,j,upper}, & \text{if } \hat{p}_{i,j,1} \leq \hat{p}_{i,j,2} \end{cases}$$

Such that the quantity ensures that $P(\text{larger defect rate} - \text{lower defect rate} > \tilde{\delta}_{i,j}) = 1 - \alpha$ Accordingly, $(1-\alpha)\%$ of the times produces a difference (between larger and smaller defect rates) greater than the indicated value $\tilde{\delta}_{i,j}$ even though a new set of samples is used. The predicted value can be lower than $|\hat{p}_{i,j,1} - \hat{p}_{i,j,2}|$, and provide a more robust estimate.

At 546, the robust defect rate reduction analytics module 540 calculates robust overall reduction in defect rate: $\tilde{\delta}_{i,j}$ calculated above quantifies the lower band of difference between larger and smaller defect rates. Based on defect rates, the robust overall reduction in the defect rate (e.g., r-score $r_{i,j}$) is calculated as:

$$r_{i,j} = \begin{cases} \frac{\tilde{\delta}_{i,j} * n_{i,j,1}}{n_{i,j,1} + n_{i,j,2}}, & \text{if } \hat{p}_{i,j,1} > \hat{p}_{i,j,2} \\ \frac{\tilde{\delta}_{i,j} * n_{i,j,2}}{n_{i,j,1} + n_{i,j,2}}, & \text{if } \hat{p}_{i,j,1} \leq \hat{p}_{i,j,2} \end{cases}$$

R-score is a lower band of reduction in an overall defect rate. That is, the numerator is the expected number of defective units will be non-defective if the manufacturer avoids the high-risk region (i.e., $G_{i,j,1}$, if $\hat{p}_{i,j,1} > \hat{p}_{i,j,1}$; $G_{i,j,2}$, if $\hat{p}_{i,j,1} \leq \hat{p}_{i,j,1}$). The denominator is the total number of units in the sample. The r-score is a superior metric than $\tilde{\delta}_{i,j}$ as it takes the size of $G_{i,j,1}$ and $G_{i,j,2}$ into account.

For example, in a toy manufacturing where $\tilde{\delta}_{i,j}$ cannot work as well as r-score, suppose the defect rate in $G_{i,j,1}$ is 100% and the defect rate in $G_{i,j,2}$ is 10%, then $\tilde{\delta}_{i,j}$ is a large number. However, if there is only 1 unit in $G_{i,j,1}$, then improvement can only be made on 1 unit. Thus the overall performance impact is insignificant.

At 548, the robust defect rate reduction analytics module 540 checks the appropriateness of conditions: when choosing the conditions with a large r-score, conditions with a large portion on the high-risk region are chosen and the manufacturer is then recommended to make changes that will affect a large portion of their products or manufacturing line. Large changes may make the manufacturer reluctant to implement the recommendations for the changes. Examining the comparative sizes of high-risk and low-risk groups under each condition can provide a better suited recommendation. Conditions can be retained that satisfy a certain criterion depending on the use cases. For example, the criterion can be a sample size in the high-risk group that should be smaller, or the sample size in the high-risk group that should be less than 30% of the entire sample size, etc. For all conditions those fail to satisfy the pre-specified criterion, the r-score can be set to be −100.

At 550, the robust defect rate reduction analytics module 540 select top conditions such that for a given feature $x_i$, aggregate its k conditions and get a r-score for $x_i$ (denoted as $\tilde{r}_i$) as follows:

$\tilde{r}_i = \max(r_{i,j})$

Then the robust defect rate reduction analytics module 540 ranks the importance of the N features using the corresponding feature-level r-score.

An example interpretation of the results can suppose that among all good conditions, $(x_5, \theta_{5,18})$ yields the largest r-score. The defect rate in $G_{5,18,1}$ is 15%, the defect rate in $G_{5,18,2}$ is 11%, and the calculated r-score is 3.2%. Then feature $x_5$ may be highly related to the test data in quality test, and a recommendation may be for the manufacturer to control $x_5$ being greater than $\theta_{5,18}$ (as $G_{5,18,2}$ has lower defect rate) and the overall reduction in defect rate is 3.2%.

Dependent Processes Implementation

FIG. 6 illustrates an example defect rate analytics system 600 with dependent processes in accordance with an example implementation. In the second example implementation for manufacturing lines with dependent processes, the defect rate analytics system 600 is directed to processes along the manufacturing lines that are independent. For example, a latter process (process 10) is not affected by the previous processes (processes 1 to 9). There are circumstances where the effects are accumulative along the manufacturing line. In an example implementation, a defect rate analytics system handles non-independent processes.

The input data for the defect rate analytics system 600 includes process data 602, test result data 604, and metadata 606 similar to defect rate analytics system 300 of FIG. 3 but associated with a manufacturing line with dependent processes. An example implementation with dependent processes includes a data preparation 620 module, remove accumulated effects 630 module, and a robust defect rate reduction analytics 640 module to output suggestions and robust effect quantifications 556. Data preparation 620 module prepares the raw process data by transforming it into the convenient format, handling missing values and outliers, removing invalid data, etc. as described in reference to data preparation 320 of FIG. 3.

Remove accumulated effects 630 module removes the accumulated effects along the sequential manufacturing line to achieve isolated effects within each process, as described in FIG. 7.

Robust defect rate reduction analytics 640 module search for processes which are highly related to the high defect rate in the quality test based on the modified data from the previous step. It also detects high risk regions in those processes and calculates a robust metric to quantify the reduction in defect rate supposing the manufacturer can avoid those high-risk regions. Robust defect rate reduction analytics 640 is modified from the robust defect rate reduction analytics 340 of FIG. 3. However, the input to the robust defect rate reduction analytics 640 is the output of modified data with accumulated effects removed 636 from the accumulated effects 630 module and the output of the robust defect rate reduction analytics 640 is based on the modified data instead of raw data as described in FIGS. 7 and 8.

FIG. 7 illustrates an example remove accumulated effects 630 module in accordance with an example implementation. Remove accumulated effects 630 module provides a systematical way to remove the accumulated effects along the production lines using cleaned data 626 from data preparation 620 to output modified data with accumulated effects removed 636 that is used for robust defect rate reduction analytics 640 of FIG. 6. Removing accumulated effects provides more accurate data to quantify the effect of each process when the processes are known to be related.

The learn accumulated effects 632 module performs for the i th process in the production line, it learns the effects accumulated from the previous (i−1) processes by building a regression model to predict the ith process based on the previous (i−1) processes. The remove accumulated effects 634 module deducts the raw data for the ith process by the fitted data from regression models. The calculated data is denoted as modified process i.

FIG. 8 illustrates a table 800 of example output data for dependent processes in accordance with an example implementation. The table 800 includes sample output of the accumulated effects removal process for products with product IDs 60001, 60002, 60003, 60004, etc. For example, the product with product ID 60001 have value 12.5 for Process 1, . . . , value 2.1 for modified Process 2, value 47 for modified Process N, and a defect label of Pass.

The product with product ID 60002 take value 11.1 for Process 1, 2.7 modified Process 2, . . . , 45 for Modified Process N, and a defect label of Pass. The product with product ID 60003 take value 19.3 for Process 1, −1.1 modified Process 2, . . . , 32 for Modified Process N, and a defect label of Fail. The product with product ID 60004 take value 9.9 for Process 1, 3.6 modified Process 2, . . . , 66 for Modified Process N, and a defect label of Pass.

Robust defect rate reduction analytics 640 of FIG. 6 is modified from the robust defect rate reduction analytics 340 of FIG. 3 with modified input and output. The input to the robust defect rate reduction analytics 640 is the output of modified data with accumulated effects removed 636 from the accumulated effects 630 module.

The robust defect rate reduction analytics 340 of FIG. 3 outputs highly correlated processes, how to control the relevant processes (e.g., process 1<40, process 2>100, etc.), and the corresponding robust estimates of defect rate reductions. The robust defect rate reduction analytics 640 module can use modified data instead of raw data and can output highly correlated processes, how to control the relevant processes, and the corresponding robust estimates of defect rate reductions. However, the output for how to control the relevant processes will for example have modified process 1<10, modified process 2>20. Modified process data do not have direct meaning as the raw data do, but they can still make suggestions and be used to generate recommendations, about direction, For example, the robust defect rate reduction analytics 640 module can indicate smaller process 1 is better, or larger process 2 is better. Then based on the information, domain experts can search for possible rate causes for the higher defect rates.

The defect rate analytics system 600 with dependent processes provides more accurate lists for the highly correlated processes when the effects do accumulate along the manufacturing lines. For example, if a dependent process manufacturing line is analyzed without accounting for the possible accumulated effects, then a recommendation may be improperly directed to processes which do not affect the quality test at all and thus less accurate. The robust defect rate reduction analytics 640 of FIG. 6 uses the modified data with accumulated effects removed 636 to provide improved suggestions and robust effect quantifications 656.

Figure 9:
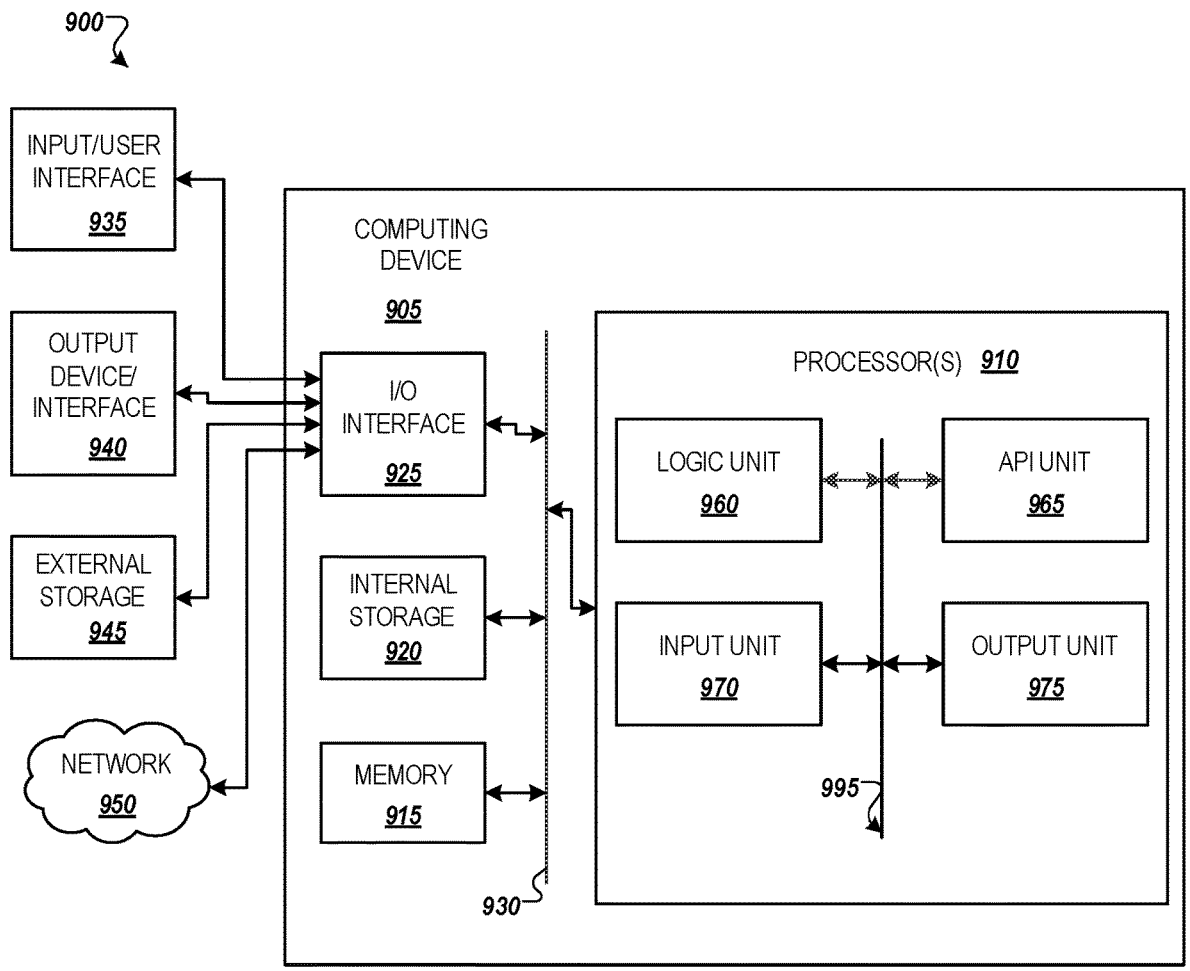
FIG. 9 illustrates an example computing environment with an example computer device suitable for use in some example implementations.

FIG. 9 illustrates an example computing environment 900 with an example computer device suitable for use in some example implementations, such as for facilitating a system for determining true defect rate of a manufacturing process illustrated in FIGS. 2-8. Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "determining" "calculating," "applying," "outputting," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The processor 910 is configured to determine, from data associated with each data feature for a manufacturing process, the data feature indicative of process defects detected based on the feature, an estimated condition for the feature that reduces a defect rate of the process defects, the estimated condition indicating the data into a first group and second group as illustrated in FIG. 2 at 210, 215, 230, FIG. 3 at 320 and FIG. 6 at 620. The processor 910 is configured to calculate a rate reduction of the defect rate based on a difference in defects between the first group and the second group as illustrated in FIG. 2 at 240, FIG. 3 at 340, FIG. 5 at 540, and FIG. 6 at 640. For the rate reduction meeting a target confidence level for a target defect rate, the processor 910 is configured apply the estimated condition to the manufacturing process associated with each of the features as illustrated in FIG. 2 at 250, 260 FIG. 3 at 340, FIG. 5 at 540, and FIG. 6 at 640.

In an example implementation, the processor 910 is configured to determine the data feature indicative of process defects detected based on the data feature comprises for the manufacturing process comprises involving related processes, remove one or more accumulated effects of the process detects associated with the related processes as illustrated in FIG. 6 at 630 and FIG. 7 at 630. The processor 910 is configured where the one or more accumulated effects are learned from a regression model configured to predict an effect of a process from the related processes, based on one or more prevision iterations of the process from the related processes; wherein the removing the one or accumulated effects comprises applying fitted data from the regression model to remove the one or more accumulated effects for the process from the related processes as illustrated in FIG. 6 at 630 and FIG. 7 at 630, 632, and 634.

In an example implementation, the processor 910 is configured where application of estimated conditions is conducted for features that are ranked above a threshold as illustrated in FIG. 5 at 550. The processor 910 is configured such that the target confidence level is a statistical confidence indicative of repeatability rate of the target defect rate as illustrated in FIG. 2 at 250 and FIG. 5 at 544 and 546.

The processor 910 is configured where the calculating the rate reduction of the defect rate based on the difference in defects between the first group and the second group as illustrated in FIG. 2 at 240 and FIG. 5 at 544 and 546. For a true unknown defect rate of the first group exceeding that of the second group: the calculating of the rate reduction is a ratio of a product of a robust estimate and total number of units of the first group, and a sum of total units of the first group and the second group as illustrated in FIG. 2 at 240 and FIG. 5 at 540, 544, 546, 548, and 550. For the true unknown defect rate of the first group not exceeding that of the second group the calculating of the rate reduction is a ratio of a product of a robust estimate and total number of units of the second group, and a sum of total units of the first group and the second group as illustrated in FIG. 2 at 240 and FIG. 5 at 540, 544, 546, 548, and 550.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
    determining, from data associated with each data feature for a manufacturing process, the data feature indicative of process defects detected based on the data feature, and an estimated condition for the feature that reduces a defect rate of the process defects, the estimated condition indicating the data into a first group and second group;
    calculating a rate reduction of the defect rate based on a difference in defects between the first group and the second group; and
    for the rate reduction meeting a target confidence level for a target defect rate, applying the estimated condition to the manufacturing process associated with each of the features.

2. The method of claim 1, wherein the determining the data feature indicative of process defects detected based on the data feature comprises, for the manufacturing process involving related processes, removing one or more accumulated effects of the process detects associated with the related processes.

3. The method of claim 2, wherein the one or more accumulated effects are learned from a regression model configured to predict an effect of a process from the related processes, based on one or more prevision iterations of the process from the related processes; wherein the removing the one or accumulated effects comprises applying fitted data from the regression model to remove the one or more accumulated effects for the process from the related processes.

4. The method of claim 1, wherein an application of estimated conditions is conducted for features that are ranked above a threshold.

5. The method of claim 1, wherein the target confidence level is a statistical confidence indicative of a repeatability rate of the target defect rate.

6. The method of claim 1, wherein the calculating the rate reduction of the defect rate based on the difference in defects between the first group and the second group comprises:
    for a true unknown defect rate of the first group exceeding that of the second group: the calculating of the rate reduction is a ratio of a product of a robust estimate and total number of units of the first group, and a sum of total units of the first group and the second group; and
    for the true unknown defect rate of the first group not exceeding that of the second group: the calculating of the rate reduction is a ratio of a product of a robust estimate and total number of units of the second group, and a sum of total units of the first group and the second group.

7. A system comprising:
    a memory;
    a processing device configured to:
    determine, from data associated with each data feature for a manufacturing process, the data feature indicative of process defects detected based on the data feature, and an estimated condition for the feature that reduces a defect rate of the process defects, the estimated condition indicating the data into a first group and second group;
    calculate a rate reduction of the defect rate based on a difference in defects between the first group and the second group; and for the rate reduction meeting a target confidence level for a target defect rate, apply the estimated condition to the manufacturing process associated with each of the features.

8. The system of claim 7, wherein the processing device is configured to determine the data feature indicative of process defects detected based on the data feature by, for the manufacturing process involving related processes, removing one or more accumulated effects of the process detects associated with the related processes.

9. The system of claim 8, wherein the one or more accumulated effects are learned from a regression model configured to predict an effect of a process from the related processes, based on one or more prevision iterations of the process from the related processes; wherein the removing the one or accumulated effects comprises applying fitted data from the regression model to remove the one or more accumulated effects for the process from the related processes.

10. The system of claim 7, wherein an application of estimated conditions is conducted for features that are ranked above a threshold.

11. The system of claim 7, wherein the target confidence level is a statistical confidence indicative of a repeatability rate of the target defect rate.

12. The system of claim 7, wherein the calculating the rate reduction of the defect rate based on the difference in defects between the first group and the second group comprises:
for a true unknown defect rate of the first group exceeding that of the second group: the calculating of the rate reduction is a ratio of a product of a robust estimate and total number of units of the first group, and a sum of total units of the first group and the second group; and
for the true unknown defect rate of the first group not exceeding that of the second group: the calculating of the rate reduction is a ratio of a product of a robust estimate and total number of units of the second group, and a sum of total units of the first group and the second group.

13. A non-transitory computer-readable medium storing instructions for a policy based network application management system, the instructions executed by a processing device, the instructions comprising:
determining, from data associated with each data feature for a manufacturing process, the data feature indicative of process defects detected based on the data feature, and an estimated condition for the feature that reduces a defect rate of the process defects, the estimated condition indicating the data into a first group and second group;
calculating a rate reduction of the defect rate based on a difference in defects between the first group and the second group; and
for the rate reduction meeting a target confidence level for a target defect rate, applying the estimated condition to the manufacturing process associated with each of the features.

14. The non-transitory computer-readable medium of claim 13, wherein determining the data feature indicative of process defects detected based on the data feature comprises, for the manufacturing process involving related processes, removing one or more accumulated effects of the process detects associated with the related processes.

15. The non-transitory computer-readable medium of claim 14, wherein the one or more accumulated effects are learned from a regression model configured to predict an effect of a process from the related processes, based on one or more prevision iterations of the process from the related processes; wherein the removing the one or accumulated effects comprises applying fitted data from the regression model to remove the one or more accumulated effects for the process from the related processes.

16. The non-transitory computer-readable medium of claim 13, wherein an application of estimated conditions is conducted for features that are ranked above a threshold.

17. The non-transitory computer-readable medium of claim 13, wherein the target confidence level is a statistical confidence indicative of a repeatability rate of the target defect rate.

18. The non-transitory computer-readable medium of claim 13, wherein the calculating the rate reduction of the defect rate based on the difference in defects between the first group and the second group comprises:
for a true unknown defect rate of the first group exceeding that of the second group: the calculating of the rate reduction is a ratio of a product of a robust estimate and total number of units of the first group, and a sum of total units of the first group and the second group; and
for the true unknown defect rate of the first group not exceeding that of the second group: the calculating of the rate reduction is a ratio of a product of a robust estimate and total number of units of the second group, and a sum of total units of the first group and the second group.

* * * * *